United States Patent [11] 3,593,319

[72] Inventor William D. Barber
Schenectady, N.Y.
[21] Appl. No. 786,269
[22] Filed Dec. 23, 1968
[45] Patented July 13, 1971
[73] Assignee General Electric Company

[54] CARD-CHANGEABLE CAPACITOR READ-ONLY MEMORY
6 Claims, 9 Drawing Figs.

[52] U.S. Cl. 340/173 SP, 235/61.11
[51] Int. Cl. G11c 17/00
[50] Field of Search 340/173

[56] References Cited
UNITED STATES PATENTS 3,003,143 10/1961 Burrier 340/173
3,253,267 5/1966 Ishidate 340/173

*Primary Examiner*—Terrell W. Fears
*Attorneys*—Paul A. Frank, Richard R. Brainard, John J. Kissane, Frank L. Neuhauser, Oscar B. Waddell and Melvin M. Goldenberg

ABSTRACT: A low cost read-only capacitive storage memory is described wherein the word lines and bit lines of the read matrix are formed as a plurality of straight conductors orthogonally disposed on opposite sides of an insulating layer. To encode the read matrix, a printed circuit card having conductive platelets selectively positioned thereon is disposed conductor-side downward atop the matrix with the platelets in registration with selective crossover areas of the word and bit lines and readout is effected by a measurement of the electrical signal capacitively coupled from a driven word line to the bit lines. Preferably the platelets are formed as orthogonal crosses vacuum deposited atop a flexible substrate to permit contouring of the platelets for maximum capacitive coupling between the word and bit lines.

Figure 1:
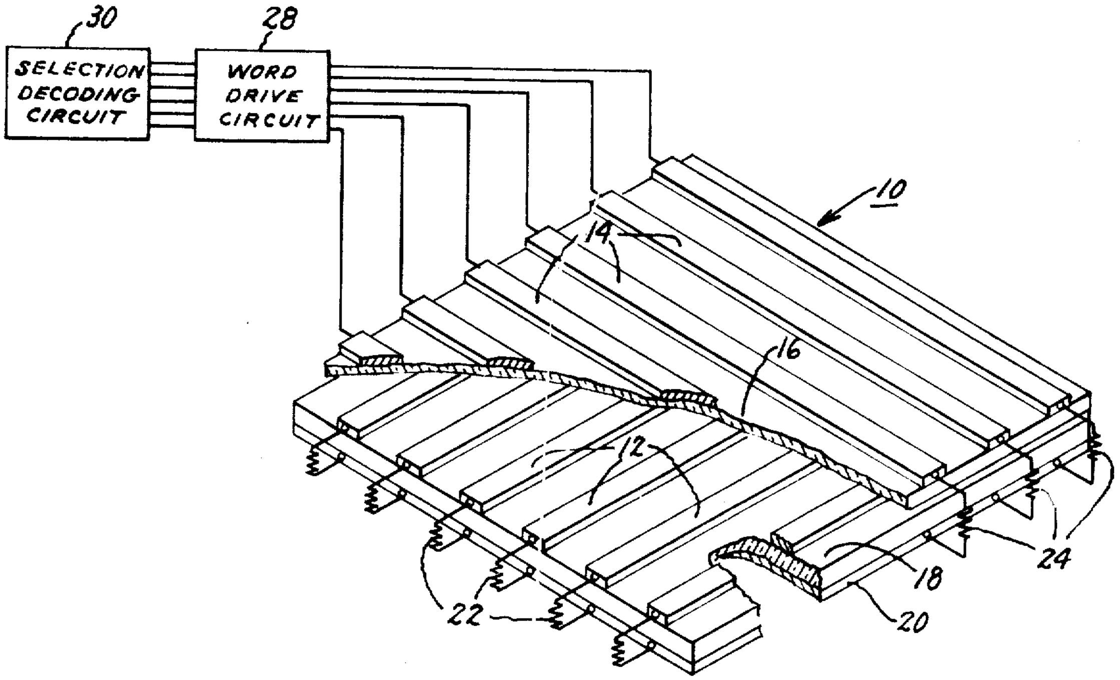

Inventor:
William D. Barber,
by John J Kinane
His Attorney.

Inventor:
William D. Barber,
by John J. Kissane
His Attorney.

Inventor:
William D. Barber,
by John J. Kessler
His Attorney.

CARD-CHANGEABLE CAPACITOR READ-ONLY MEMORY

THE DISCLOSURE

This invention relates to a card-changeable capacitive read-only memory and in particular to a memory wherein readout is achieved by detection of the signal capacitively coupled between straight word and bit lines disposed on opposite sides of an insulating layer.

Capacitively coupled read-only memory storage systems generally provide an inexpensive technique for permanently storing microinstructions and a variety of memory configurations have been employed to capacitively couple information between selected word and bit lines forming the memory. For example, the capacitive coupling between straight word and bit lines forming a read matrix has been varied by the insertion of a selectively perforated conductive plate between the word line and bit line planes to shield selected bit lines from the overlying word lines. The proximity of the word and bit lines forming the matrix however generally requires a physical separation of the matrix lines to permit an interchange of instructions. In another capacitor read-only memory storage system, information of a given magnitude is permanently recorded by an etching of one set of lines with tabs extending outwardly therefrom at selected locations. Alteration of the information thus requires the complete removal of one set of matrix lines (and the electrical connection thereto) and the substitution of a completely new set of matrix lines etched in a new configuration. It also has been proposed that a portion of both the word lines and bit lines forming the read matrix be deposited on a single face of an insulating substrate with platelet elements on a separate card being employed to capacitively couple selective tabs. This system however requires an electrical connection from the tabs on the common face of the insulating layer to conductors extending along the opposite face of the insulating layer and the art work on the face containing portions of both conductors is quite extensive.

It is therefore an object of this invention to provide a low-cost capacitively coupled read-only memory characterized by a matrix of straight conductors.

It is also an object of this invention to provide a capacitively coupled read-only memory wherein encoding of new instructions is accomplished without interconnection of electrical leads.

It is a still further object of this invention to provide a low-cost capacitively coupled read-only memory wherein the coupling between straight orthogonal lines forming the read matrix is maximized by the design configuration of the overlying platelet.

These and other objects of this invention are achieved in a read-only memory having a read matrix characterized by an insulating layer having a plurality of parallel conductors orthogonally disposed along opposite faces of the insulating layer. To encode the matrix, a storage medium having areas of a relatively high conductivity material representative of information of a first magnitude and areas of a relatively low conductivity material representing information of a second magnitude is externally disposed in juxtaposition relative to the read matrix with each information area being registered with a conductor crossover area of the matrix. Preferably, each area of high conductivity material extends beyond at least one edge of the underlying crossover area of the conductors to capacitively couple the conductors common to the crossover area and means are provided for selectively driving at least one conductor forming the read matrix. The electrical signals capacitively coupled from the driven conductor to an orthogonally disposed conductor are detected by suitable means and the logic number at each particular bit site is determined by the magnitude and/or polarity of the coupled signal.

Figure 2:
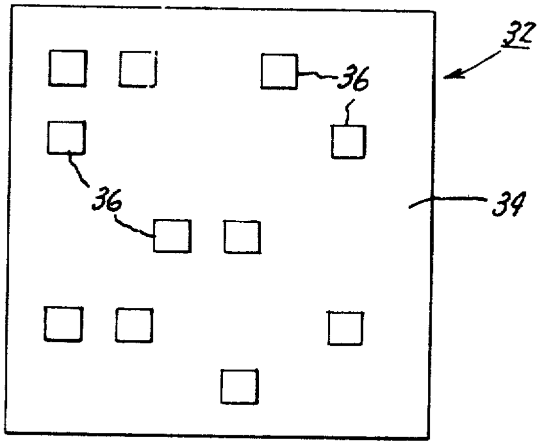
Figure 3:
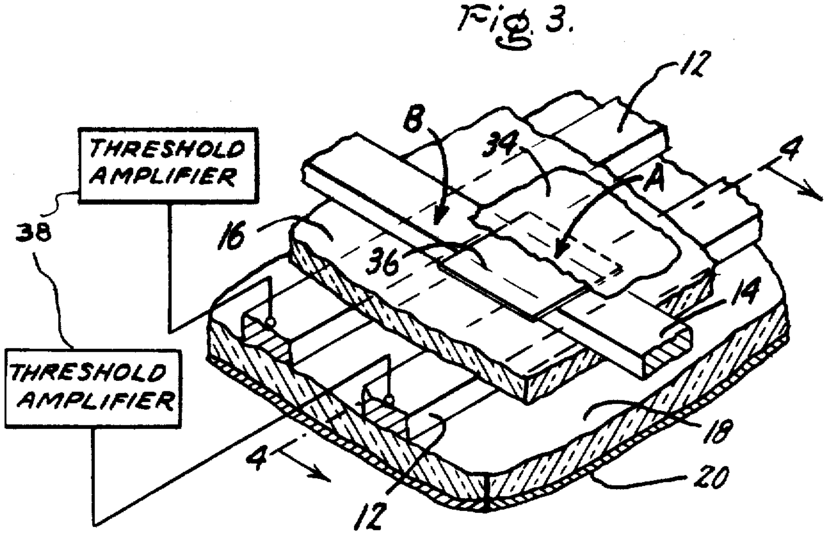
Figure 5:
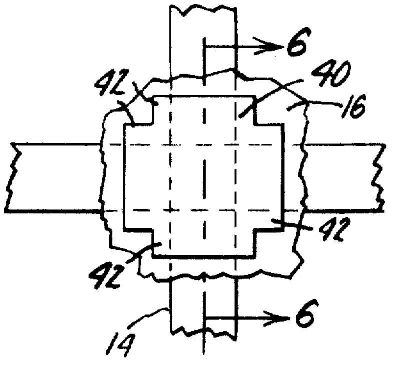
Figure 4:
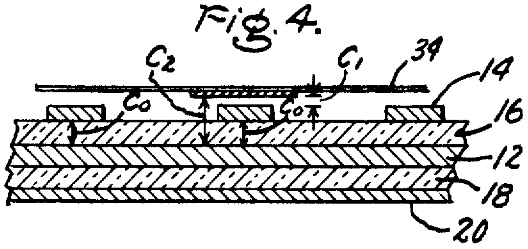
Figure 7:
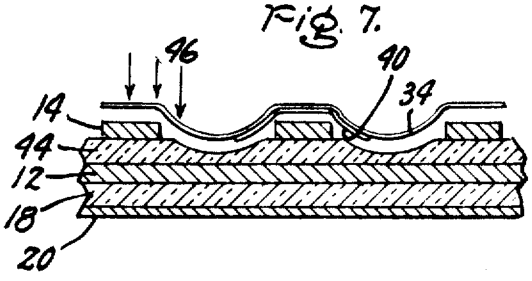
Figure 6:
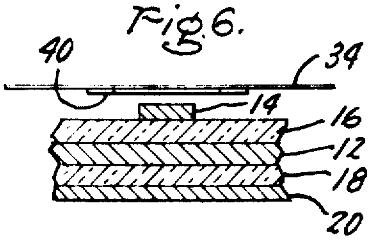
Figure 8:
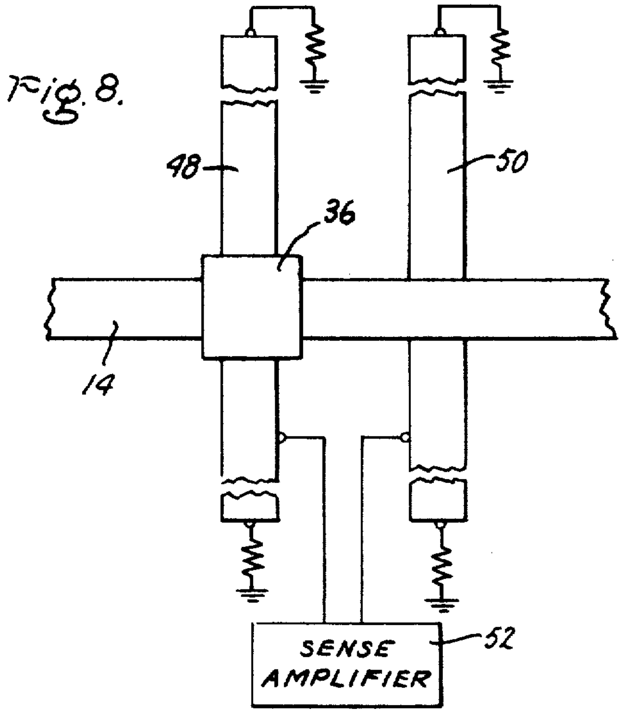
Figure 9:
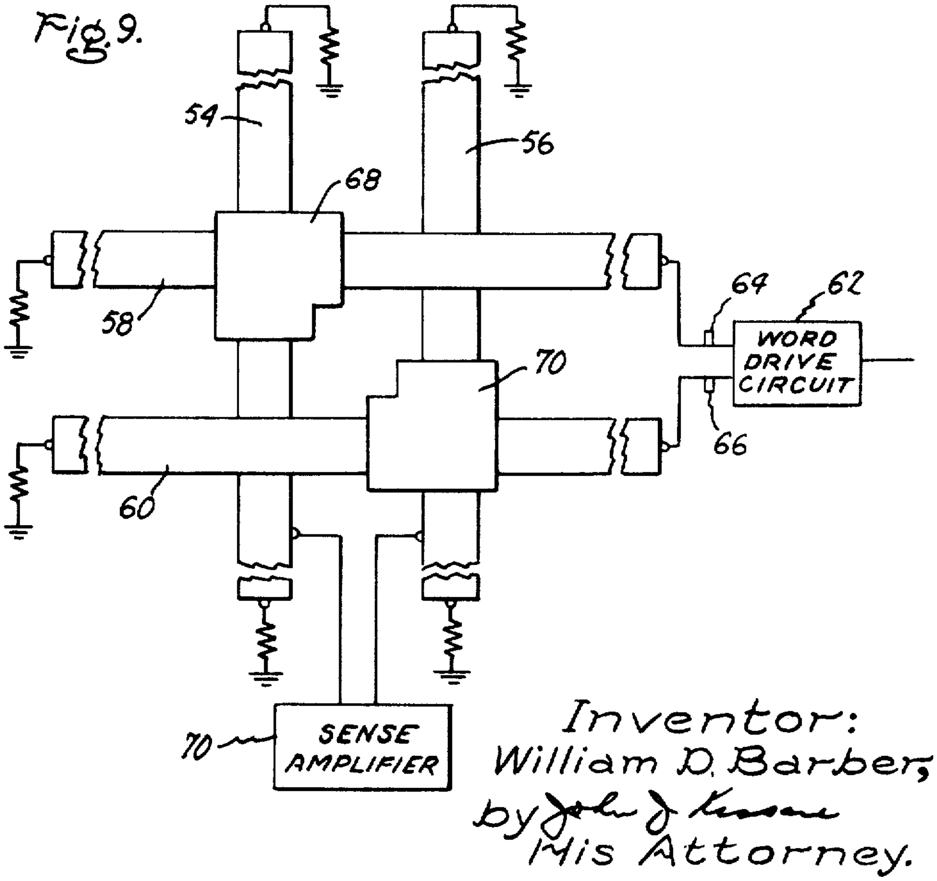

The novel features believed characteristic of the invention are set forth in the appended claims. The invention itself, together with further objects and advantages thereof may best be understood by reference to the following description, taken in connection with the accompanying drawings, in which:

FIG. 1 is an enlarged isometric view of a read matrix forming the capacitor read-only memory system of this invention, FIG. 2 is an enlarged plan view of storage medium suitable for encoding the matrix, FIG. 3 is an enlarged isometric view illustrating registration of the storage medium and read matrix at a bit site, FIG. 4 is a sectional view taken along lines 4—4 of FIG. 3, FIG. 5 is a plan view of a preferred platelet geometry in accordance with this invention, FIG. 6 is a sectional view taken along lines 6—6 of FIG. 5, FIG. 7 is a sectional view of an improved structure for maximizing coupling between the matrix conductors, FIG. 8 is an enlarged pictorial illustration of a bit site employing two crossover areas, and FIG. 9 is a pictorial illustration of a bit site employing four crossover areas of the matrix conductors.

A read matrix 10 in accordance with this invention generally comprises a plurality of parallel extending, straight bit sense lines 12 underlying and spaced apart from a plurality of straight parallel extending word lines 14 by an insulating layer 16. Bit lines 12 and word lines 14 are orthogonally disposed relative to each other in a matrix configuration and the matrix is positioned atop a second insulating layer 18 separating the matrix from a conductive ground plane 20. Termination resistors 22 matching the characteristic impedance of bit sense lines 12 interconnect each end of the bit sense lines with ground plane 20 while a second set of impedance matching termination resistors 24 are connected between one end of word lines 14 and ground plane 20. The ends of word lines 14 remote from termination resistors 24 are connected in a conventional fashion to individual output terminals of word drive circuit 28, e.g. a plurality of base driven emitter followers, to permit interrogation of matrix 10 during readout. A selection decoding circuit 30, e.g. a conventional transistorized selection matrix, serves to supervise the energization of word drive circuit 28 to permit random access to each word line forming matrix 10.

In forming one particular matrix, a set of 25 mil wide straight parallel conductors separated by a 50 mil spacing were etched on one side of a conventional double sided copper clad printed circuit board while the copper plating on the opposite side was left intact to serve as a ground plane. A second set of 25 mil wide straight parallel conductors with a 50 mil spacing then were etched on a 2 mil epoxy-glass substrate and an orthogonal matrix was formed by gluing the epoxy-glass substrate stop the etched conductors in the double sided printed circuit board. Termination resistors matching the characteristic impedance of each conductor then were soldered between the conductors and the ground plane.

An information card 32 employed to encode the array is depicted in FIG. 2 and generally comprises a thin dielectric substrate 34 upon which conductive platelets 36 are selectively disposed, e.g. for a logic one at a particular bit site, a conductive platelet is deposited upon substrate 34 at a location to be in registration with a selected conductor crossover area of matrix 10 forming the bit site when the card is placed platelet face downward in an overlying position relative to matrix 10 such as is shown at bit site A in FIG. 3. A logic zero then is encoded by the absence of a platelet in an overlying attitude relative to the crossover location of the bit sense line and word line forming a bit site as is shown at bit site B. The platelet employed to encode the matrix should extend to a width at least 10 percent greater than the conductor crossover area with which the platelet is registered to insure a detectable variation in the capacitive coupling between the word and bit sense lines dependent upon the presence of a registered overlying platelet.

As can be seen from the sectional view of FIG. 4, the coupling capacitance between each word line and bit sense line of matrix 10 is dependent primarily on the thickness and dielectric constant of insulating layer 16 and is equal to a fixed value C when no platelet is disposed in an overlying attitude relative to the crossover area of the lines. However where a platelet is disposed in registration with an underlying crossover area, a capacitance $C_1$ is formed between the platelet and the underlying word line and a second capacitance $C_2$ is formed between the overhanging portion of the platelet and the bit sense line. The coupling capacitance between the bit sense line and word line with a platelet in registration with the crossover area then becomes approximately equal to $$C_0+(C_1 C_2/C_1+C_2)$$

For values of $C_1$ greatly in excess of $C_2$, the capacitive coupling between the word and bit sense lines with an overlying platelet becomes equal to approximately $$C_2+C_0$$

Because a variation in the coupling capacitance between the word and bit sense lines at a crossover area requires an overlap of the registered platelet relative to the edge of underlying word line 14, platelet 36 should overlap at least 10 percent of the word line width beyond the edge of the word line and desirably extends beyond the word line edge by a distance approximately equal the span between the platelet and bit sense line 12. Although platelet 36 preferably is a metallic film, e.g. a vapor deposited copper film photoetched to the desired configuration, the high capacitive impedance between the matrix lines permits the utilization of platelets formed of relatively high resistance materials, such as graphite. In general, the impedance of the platelet should be no greater than 10 percent of the capacitive impedance between the platelet and bit line to permit a readily detectable variation in coupling between matrix lines dependent upon the presence or absence of a platelet at a crossover area.

In the operation of the capacitive read-only memory of FIG. 1, card 32 having conductive platelets 36 selectively disposed thereon is positioned platelet face downward in an overlying attitude relative to the read matrix 10 with the platelets in registration with selected crossover areas of the word and bit sense lines forming the matrix. The matrix then is interrogated by the initiation of an output pulse from selective decoding circuit 30 which pulse activates an individual output terminal of word drive circuit 28 to energize a selected word line with a voltage pulse of a chosen magnitude, e.g. a 5 v. pulse. Energization of the word line is capacitively coupled to each underlying bit sense line with the magnitude of coupling between the lines varying dependent upon the presence of a platelet overlying the crossover area of the word line and the bit sense line. The output signal coupled to each bit sense line then is detected by a threshold amplifier 38 connected to the bit sense line. Because the amplitude of the detected signal is dependent upon the coupling between the word line and the bit sense line (and therefore dependent upon the positioning of a platelet overlying the crossover area), detected signals of diverse amplitudes are employed to represent logic numbers of different magnitude.

To increase the capacitive coupling between the bit sense line and the word line, the overlying platelet preferably is dimensioned in the configuration of the orthogonal cross such as platelet 40 portrayed in FIG. 5. Preferably, the rectangular center of platelet 40 is equal in area to the crossover area of the word and bit sense lines with the outward extensions of each arm 42 of the platelet being approximately equal to the span between the platelet and the matrix line most remote from the platelet. The geometric configuration of platelet 40 effects an enhanced capacitive coupling between the word and bit sense lines of matrix 10 while minimizing required bit area to permit high density storage of information.

The capacitive coupling between the word lines and bit sense lines of matrix 10 can be further increased by the employment of an information card having a flexible dielectric substrate, e.g. a polyimide sheet less than 10 mils thick, and by the selective etching of the insulating layer separating the word lines and the sense lines to permit a contouring of the information card, as is shown in FIG. 7. Thus a portion of the insulating layer exposed intermediate word lines 14 is selectively etched, e.g. by a acetone solution for an epoxy insulating layer, to provide a contoured insulating layer 44 which tapers from a maximum dimension underlying word lines 14 to a dimension less than one-half the maximum midway between the word lines. After an information card having platelets 40 selectively situated thereon is positioned in an overlying attitude relative to the contoured face of the matrix with the platelets in registration with the conductor crossover areas of the matrix, pressure is uniformly applied to the information card face remote from the platelets, e.g. by an air jet depicted by arrows 46, to contour the flexible substrate and platelets into a configuration complementary to the face of matrix 10 in contact therewith. The contoured shape of platelets 40 maximizes the coupling between word lines 14 and bit sense lines 12 to generate a relatively enhanced signal through the platelet to the bit sense line upon energization of the word line corresponding to the selected crossover area. For proper contouring of the information card, platelets 40 preferably are less than 1 mil in thickness.

The presence of noise in the output signal from matrix 10 can be reduced by the employment of two bit sense lines for each bit site as is shown in FIG. 8. Information then is stored at a bit site by the location of the platelet relative to the bit sense lines forming the site, e.g. a logic "one" is recorded when platelet 36 is at an overlying attitude relative to bit sense line 48, as illustrated in FIG. 8, while a logic "zero" is recorded when the platelet is registered with bit sense line 50. The signals coupled from word line 14 to bit sense lines 48 and 50 are applied as differential inputs to sense amplifier 52 and an output signal is produced from the sense amplifier having a polarity indicative of the relative amplitude of the signals coupled to each bit sense line forming the bit site. Thus when platelet 36 is registered with the crossover area between word line 14 and bit sense line 48, the amplitude of the signal coupled through the platelet to sense line 48 is enhanced relative to the amplitude of the signal coupled from word line 14 to bit sense line 50. The amplitude of the signals coupled to each bit sense line are compared in sense amplifier 52 and an output signal is generated having a polarity indicative of the positioning of the platelet relative to the two bit sense lines forming the bit site. Because noise on bit sense lines 48 and 50 is in a common mode at sense amplifier 52, the signal to noise ratio produced by bit sites having dual bit sense lines is substantially increased relative to bit sites employing a single bit sense line.

To further increase the speed of operation of the capacitor read-only memory system, a constant load independent of stored information is placed upon the word drive circuit by utilizing the intersections of two bit lines and two word lines for a single bit site. To encode a binary digit of a first magnitude, platelets 68 and 70 are registered in an overlying attitude relative to the crossover areas of bit sense lines 54 and 56 with word lines 58 and 60, respectively, as illustrated in FIG. 9. To inhibit capacitive coupling of an interrogating signal from one bit site to an adjacent site, the overlying platelets preferably are of "L" configuration with the arms of the platelets extending toward two other crossover areas common to the bit site at a coplanar attitude relative to the bit sense line and word line forming the underlying registered crossover area.

In interrogating a bit site, word lines 58 and 60 are simultaneously energized from word drive circuit 62 with opposite polarity voltage pulses, e.g. pulses 64 and 66, to maximize the detectable signal from the bit site. With positive going pulse 64 applied to word line 58, a maximum positive going voltage is coupled through platelet 68 to bit sense line 54 and a minimum positive going voltage is coupled to bit sense line 56 due to the absence of an overlying platelet. Similarly, negative going pulse 66 along word line 60 couples a more negative signal to bit sense line 56 than to bit sense line 54 because of the positioning of platelet 70 at the crossover area of word lines 60 and bit line 56. The signals coupled to each bit line are summed thereon before being applied as differential inputs to sense amplifier 70 and an output signal is generated from the sense amplifier indicative of the line having the higher voltage coupled thereto. To record a differing logic number, platelets 68 and 70 are positioned in an overlying attitude relative to the crossover areas of bit lines 54 and 56 with word lines 60 and 58 respectively. In such a configuration (not shown), a maximum positive going signal on word line 58 is coupled to bit sense line 56 and a minimum negative going signal is coupled to bit sense line 56 from word line 60 to produce a total signal on bit sense line 56 having a generally positive direction. Similarly, a minimum positive going signal is coupled to bit sense line 54 from word line 58 while a maximum negative going pulse is coupled from word line 58 to bit sense line 54 to produce a total signal in a generally negative going direction. Sensing of the relative amplitudes on the bit sense line by sense amplifier 70 differentially connected to the bit sense lines produces a signal having a polarity indicative of stored information of a second magnitude.

Although the memory of this invention has been described as having the word line positioned proximate the platelets on information cards 32, either of the orthogonal lines forming matrix 10 can be employed as the word line of the memory. Similarly, highly conductive contact between the platelets and the immediately underlying conductive line may be effected by the application of sufficient force to the face of the information card remote from the matrix without departing from the scope of this invention. Thus, the platelets may form a low ohmic electrical contact, e.g. less than 100 ohms, with one line of matrix 10 rather than being capacitively coupled to both the word and bit lines as illustrated in the drawings.

I claim:

1. A read-only capacitive memory comprising a. A read matrix characterized by an insulating layer, a first plurality of parallel conductors extending across and completely underlying said insulating layer, a second plurality of parallel conductors extending across and completely overlying said insulating layer, said first conductors being orthogonal to said second conductors to form a matrix having a multiplicity of crossover areas common to said first and second plurality of conductors, said first and second plurality of parallel conductors forming an irregular surface on said insulating layer;

b. A storage medium for encoding the matrix, said storage medium being characterized by areas of a relatively high conductivity material representative of information of a first magnitude and areas of a relatively low conductivity material representative of information of a second magnitude, said storage medium being flexible and conforming in a complementary fashion to the irregular surface of said read matrix for encoding said matrix by being so positioned in close proximity thereto that each information area of said storage medium is registered with the crossover areas of said conductors forming the matrix and extends beyond at least one edge the crossover areas to capacitively couple the first and second conductors common to the crossover area;

c. Means for selectively driving at least one conductor forming the matrix; and d. Means for detecting the electrical signal capacitively coupled from said driven conductor to an orthogonally disposed conductor.

2. A read-only capacitive memory according to claim 1 wherein said relatively high conductivity areas are shaped as orthogonal crosses, the center of said crosses being registered with the center of selective crossover areas of said conductors forming the matrix.

3. A read-only capacitive memory according to claim 2 wherein the arms of said cross extend beyond the edges of the immediately underlying conductor by a distance at least equal to the span from said storage medium plane to the plane of said plurality of conductors remote from said storage medium.

4. A read-only capacitive memory according to claim 1 wherein said insulating layer is partially etched in areas intermediate one set of parallel conductors to form a contoured surface and said storage medium comprises a flexible dielectric substrate having relatively high conductivity areas selectively formed thereon, said capacitive memory further including means for contouring said flexible substrate to a complementary configuration relative to said insulating layer contoured surface.

5. A read-only capacitive memory according to claim 4 wherein said metallic areas have the general configuration of orthogonal crosses and said contouring means include means for applying forced air upon said flexible substrate face remote from said metallic areas.

6. A read-only capacitive memory according to claim 1 wherein four crossover areas of said orthogonally disposed conductors are employed to form each information storage site of said memory and said relatively high conductivity areas of said storage medium are "L" shaped, each arm of said L-shaped area extending beyond the registered crossover areas in a direction toward two other crossover areas forming the storage site.